US007201349B2

(12) United States Patent
Lavie et al.

(10) Patent No.: US 7,201,349 B2
(45) Date of Patent: Apr. 10, 2007

(54) MEDICAL UNIT IN AN AIRCRAFT

(75) Inventors: Maxime Lavie, Nailloux (FR); Bernard Rumeau, Verdun sur Garonne (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 11/221,746

(22) Filed: Sep. 9, 2005

(65) Prior Publication Data

US 2006/0060704 A1 Mar. 23, 2006

Related U.S. Application Data

(60) Provisional application No. 60/614,398, filed on Sep. 30, 2004.

(30) Foreign Application Priority Data

Sep. 9, 2004 (FR) .................................. 04 09572

(51) Int. Cl.
*B64D 11/00* (2006.01)
*B64D 13/00* (2006.01)

(52) U.S. Cl. .................................................. 244/118.5

(58) Field of Classification Search ............ 244/118.5, 244/118.6, 118.1, 137.1, 137.2, 122 R
See application file for complete search history.

(56) References Cited

U.S. PATENT DOCUMENTS 2,577,817 A * 12/1951 Schueder et al. ........... 248/439
3,439,889 A * 4/1969 Karlsen .................. 244/122 R
4,254,924 A * 3/1981 Brennan ................. 244/122 R
4,460,215 A * 7/1984 Chamberlain et al. ........ 297/14
4,625,934 A * 12/1986 Ryan et al. ............. 244/122 R
4,799,632 A * 1/1989 Baymak et al. ......... 244/122 R
4,957,121 A * 9/1990 Icenogle et al. ............ 128/897
4,993,666 A * 2/1991 Baymak et al. ......... 244/122 R
5,064,243 A * 11/1991 Quain ......................... 297/58
5,372,339 A * 12/1994 Morgan .................. 244/118.5
5,383,629 A * 1/1995 Morgan .................. 244/118.6
5,490,703 A * 2/1996 Hewko ........................ 296/19
5,496,000 A * 3/1996 Mueller .................. 244/118.1
5,615,848 A * 4/1997 Ceriani .................... 244/118.5
5,779,296 A * 7/1998 Hewko ........................ 296/19
5,813,629 A * 9/1998 Cabrera ................... 244/118.6
6,073,883 A * 6/2000 Ohlmann et al. ........ 244/118.5
6,227,489 B1 * 5/2001 Kitamoto et al. ........ 244/118.5
6,273,366 B1 * 8/2001 Sprenger et al. ......... 244/118.5
6,402,244 B1 * 6/2002 Schonenberg et al. . 297/284.11
6,585,188 B2 * 7/2003 Alli ......................... 244/118.5
6,691,952 B2 * 2/2004 Keogh ..................... 244/118.5

* cited by examiner

*Primary Examiner*—Teri Pham Luu
*Assistant Examiner*—E. J. Mayle
(74) *Attorney, Agent, or Firm*—Oblon, Spivak, McClelland, Maier & Neustadt, P.C.

(57) ABSTRACT

An aircraft cabin includes an area to permit administration of first aid medical care to a passenger. The area includes at least a regulatory space located in front of an access door to the cabin. The rest of this area is occupied by a medical module fully dedicated to the first aid medical care.

9 Claims, 6 Drawing Sheets

2
5
7
1'
6
1
3
4

5
9
6
8

5
9
6
8

5
8

MEDICAL UNIT IN AN AIRCRAFT

BACKGROUND OF THE INVENTION

1. Field of the Invention

This invention involves a medical unit that can be arranged inside a cabin of an aircraft or of another aircraft and provide high quality medical care to a passenger in flight.

Commercial flights are capable of transporting more and more passengers over periods of time that continue to grow. As such, it happens more frequently that a passenger becomes victim of an illness or another injury during flight. If this passenger requires urgent care and aircraft personnel does not have the material capabilities to administer such care, the aircraft pilot must look to land at the nearest airport. The unscheduled stoppage at an airport to disembark a patient presents obviously numerous inconveniences, such as the delay imposed onto the other passengers, increased fuel consumption and additional airport taxes.

2. Description of the Related Art

Through patent U.S. Pat. No. 6,691,952, one has knowledge of a medical unit that can be put in place during flight to provide first aid care to a passenger. When not in use, the device according to U.S. Pat. No. 6,691,952 consists of a cabinet installed in a cabinet that is arranged transversally in the aircraft cabin, in front of a row of seats; beneficially, this device only occupies a rather limited space inside the cabin. The cabinet includes a folded bed as well as compartments that contain various diagnostic and medical care accessories. To put the medical unit in place, one opens the cabinet and one deploys the bed over two rows of seats for which the back has been laid reclined.

The medical unit according to U.S. Pat. No. 6,691,952 has several inconveniences during usage. On the one hand, the arrangement is uncomfortable for the person who is taking care of the patient because this person must remain standing, in front of the other passengers, on the side of the bed; moreover, the lack of privacy of such an arrangement must be difficult for the patient and for the other passengers. On the other hand, one must necessarily remove the passengers that were seated in the seats requisitioned to be able to deploy the bed, which poses a serious safety hazard when the plane is full. Finally, the small dimensions of this medical unit make it difficult to administer complex medical care or care that requires large medical equipment.

U.S. Pat. No. 6,273,366 reveals a medical unit that avoids certain of these inconveniences just mentioned. This device, that can be used to administer first aid to an aircraft passenger (and also to transport a patient from one aircraft to another), requires that the aircraft is equipped with a large-sized toilet space located along the wall of the cabin in a position adjacent to an access door to the cabin. The device includes a bed that, when not in use, is secured vertically to a wall of the toilet. When care must be administered to a passenger, other passengers are prohibited from using this toilet. Then, the bed is placed horizontally on adequate components that are removed from the toilet area. According to the mode of execution, the bed is placed longitudinally in certain positions between two extreme positions: in one of these extreme position, the patient is fully housed inside the toilet area which permits him to rest hidden from sight; in the other extreme position, the head of the patient is located in the area located in front of said cabin door (empty space by reason of air safety regulations, but that can be used in flight), which permits comfortably administering care to the patient. The medical unit can be surrounded by a curtain for privacy purposes.

But the comfort for all of the passengers of having an additional toilet space in the absence of a patient, as is shown by U.S. Pat. No. 6,273,366 presents inconveniences in the situation where, precisely, a passenger requires emergency assistance. Indeed, firstly (and as in the case of the device according to U.S. Pat. No. 6,691,952), the person taking care of the patient must remain standing on the side of the bed. Secondly, one can ask oneself whether the use of a toilet to provide medical care offers adequate guarantees of hygiene. But above all, thirdly, the space occupied by the equipment necessary to be able to use the device according to U.S. Pat. No. 6,273,366 as a toilet space (basin, sink, etc.) severely limits the space that can be used to arrange and store medical equipment; this leads to a limitation in the technical level and quality of care that can be provided to a potential patient, whose survival, in addition, will depend on the possibility of immediately benefiting (in other words, before the aircraft has the time to land) from appropriate care for his/her condition.

As such, the invention involves an aircraft cabin comprising an area that permits administering first aid medical care to a passenger, with this area comprising at least a portion of the regulatory space located in front of an access door to said cabin, with this aircraft cabin being remarkable by the fact that the rest of this area is occupied by a medical module fully dedicated to provide said first aid medical care.

Indeed, one will observe that the medical units according to the previous state of the art are designed to take into account the fact that each square centimeter on board of the aircraft is precious; as such, they are arranged so that one can benefit, when the medical unit is not used to administer care, of an additional space that can be used in flight, for instance, to have an additional toilet available, or additional seats (and as such, to transport a larger number of passengers). However, the authors of this invention have realized, on the basis of experience of this previous state of the art, that this possibility of benefiting from an additional space is probably incompatible with the requirement of being able to dispose of a high quality medical unit. As such, according to the invention, when there is no patient, the medical module is not convertible for a use other than medical care, and this to give priority to the quality of care that this medical module will be able to offer to a potential patient.

However, it will be noted that this medical module can only occupy a rather limited cabin space, since when there is a patient, one will be able to provide such patient with the all space required to give him the proper care while completing the medical unit (as known) with the space available in front of the cabin door adjacent to the medical module.

SUMMARY OF THE INVENTION

According to the special provisions, the aircraft cabin includes at least two bridges and one staircase to link these two bridges, and the medical module is placed in a corner of the cabin located between said staircase and the access door of the cabin.

Such an arrangement of the cabin is particularly advantageous by the fact that said corner of the cabin is of little use to install passenger seats; as such, the capacity of the aircraft is not reduced (in terms of the number of passengers) by placing the medical module at this location. Moreover, if this staircase is placed in the back of the aircraft, such an arrangement permits easy isolation of the medical unit from the passenger seats.

According to other special provisions, said medical module includes a bed that can be folded inside the medical module and can be deployed in an essentially longitudinal position with respect to the fuselage of the aircraft.

Thanks to these provisions, one combines the concern for compactness (when there is no patient) with the use of said space in front of an access door to the cabin (when there is a patient).

According to provisions that are even more particular, one can have said bed slide longitudinally.

Thanks to these provisions, the caregivers can comfortably place the patient in the most adequate position according to the portion of the patient's body that needs to be observed or cared for.

According to other provisions that are even more particular, the medical module includes a seat for the caregiver that can be folded inside the medical module or deployed on the side of the bed.

Thanks to these provisions, the caregiver can be seated comfortably when administering care to the patient. When there is no patient, the caregiver seat is stored compactly inside the medical module.

According to other particular provisions, the cabin includes a folding seat on the side of said regulatory space opposite the side where the medical module is located.

Indeed, this seat can be occupied by a person administering care, in particular, by a second caregiver when the seat, mentioned above, located on the side of the bed is occupied by a first caregiver.

BRIEF DESCRIPTION OF THE DRAWINGS

Other aspects and advantages of the invention will appear from reading the detailed description below, of particular modes of implementation given as non-limiting examples. This description refers to the attached drawings in which:

illustration 1 shows a plan view of the rear part of an aircraft cabin bridge, illustrations 2*a* and 2*b* show respectively a view towards the rear and a side view of the medical unit in operation, illustrations 3*a*, 3*b* and 3*c* represent successive stages of opening of a medical module according to a first mode of execution, illustration 4 shows the medical module according to the first mode of execution with the bed deployed, illustrations 5*a*, 5*b* and 5*c* represent successive stages of opening of the medical module according to a second mode of execution, and illustrations 6*a*, 6*b* and 6*c* represent successive stages of deployment of the seat for the caregiver.

DETAILED DESCRIPTION OF THE PREFERRED EMBODIMENTS

Figure 1:
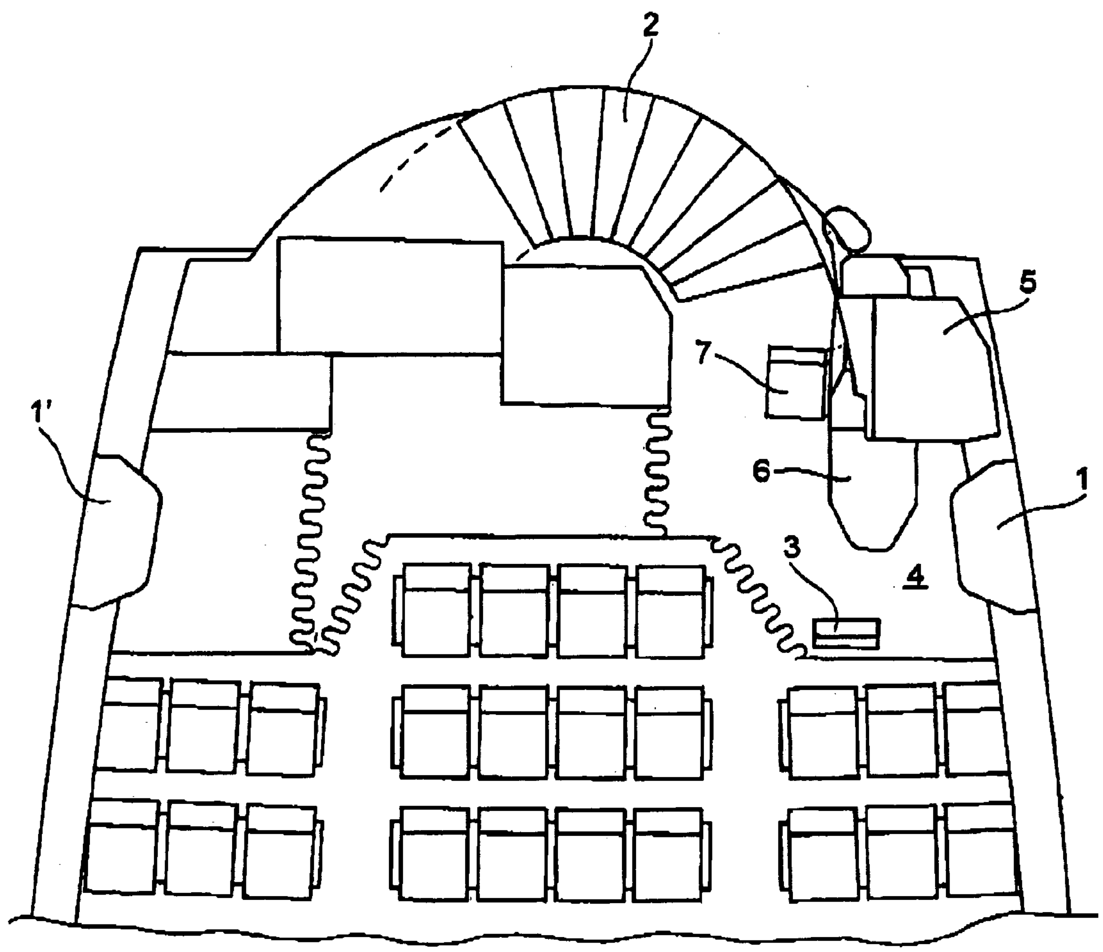
Figure 2:
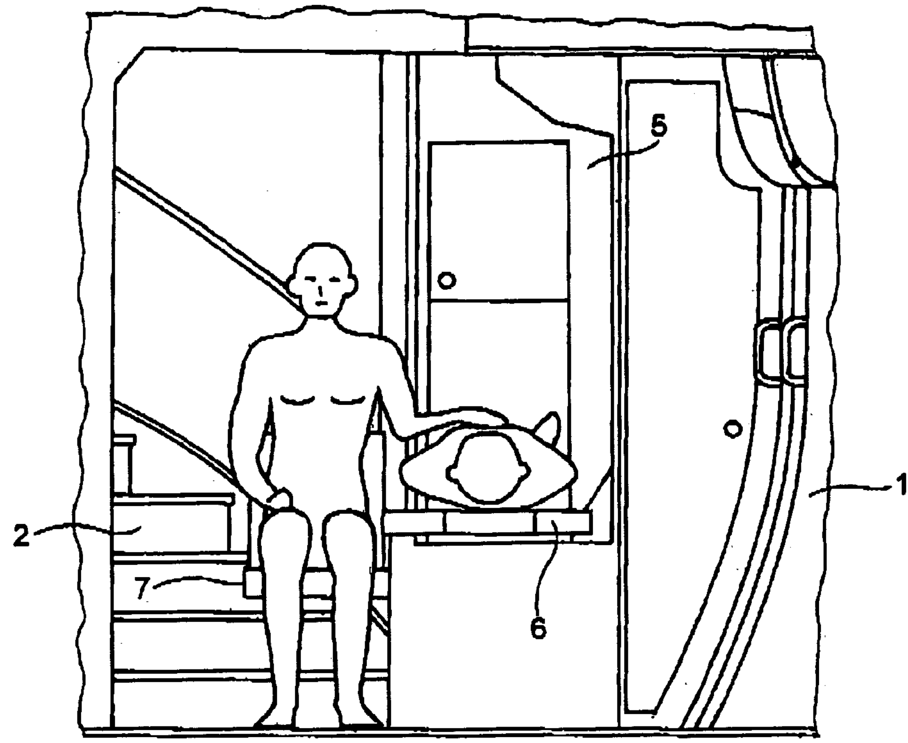
Figure 2:
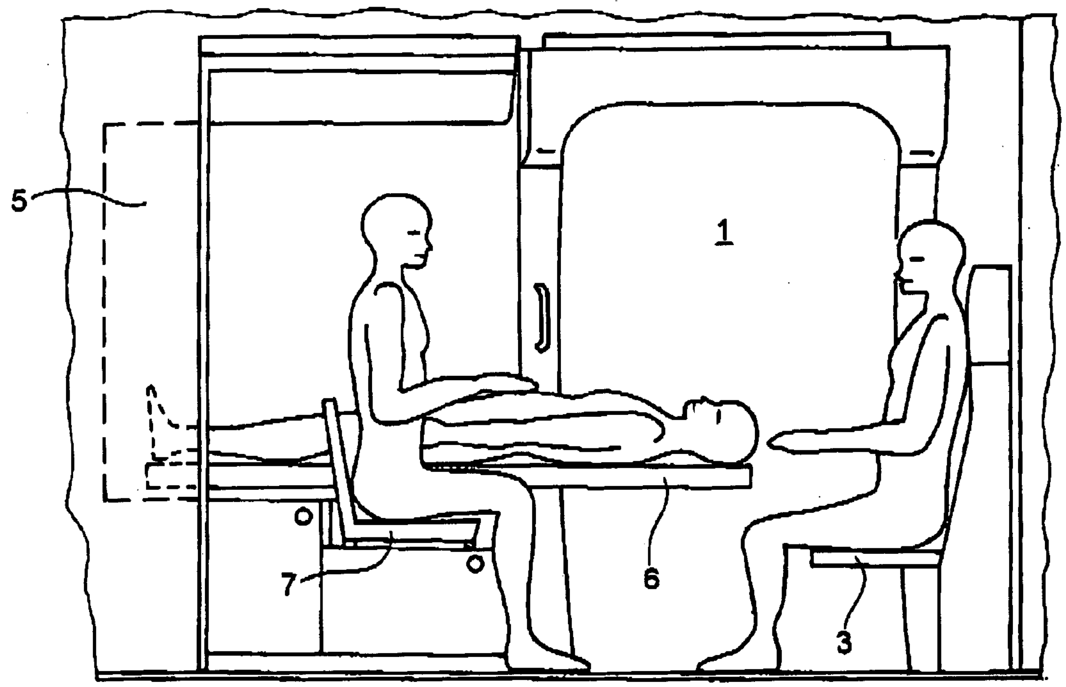
Figure 3:
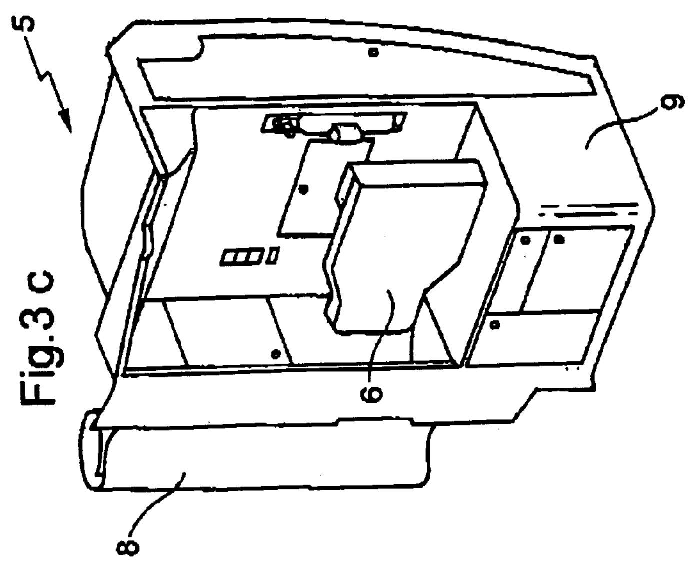
Figure 3:
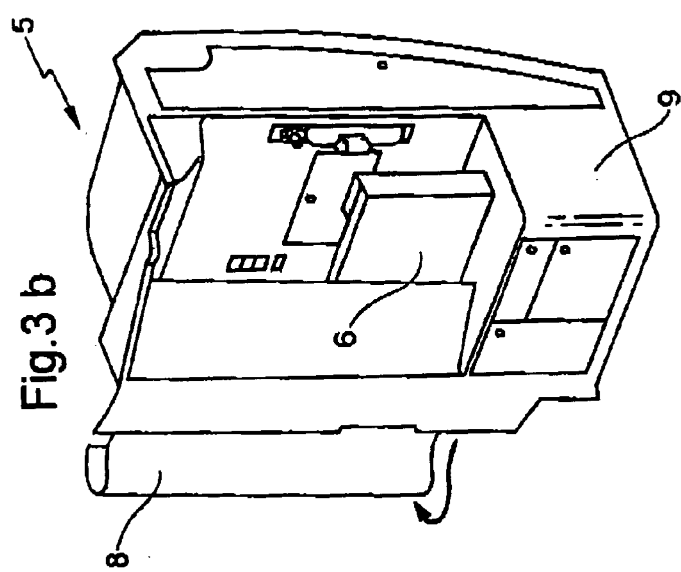
Figure 3:
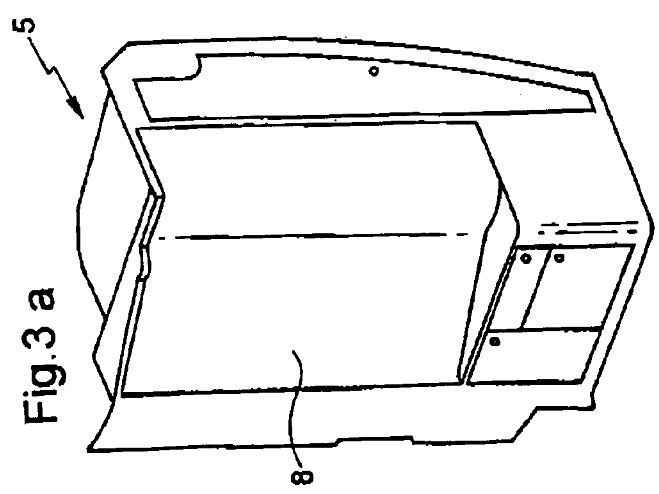
Figure 4:
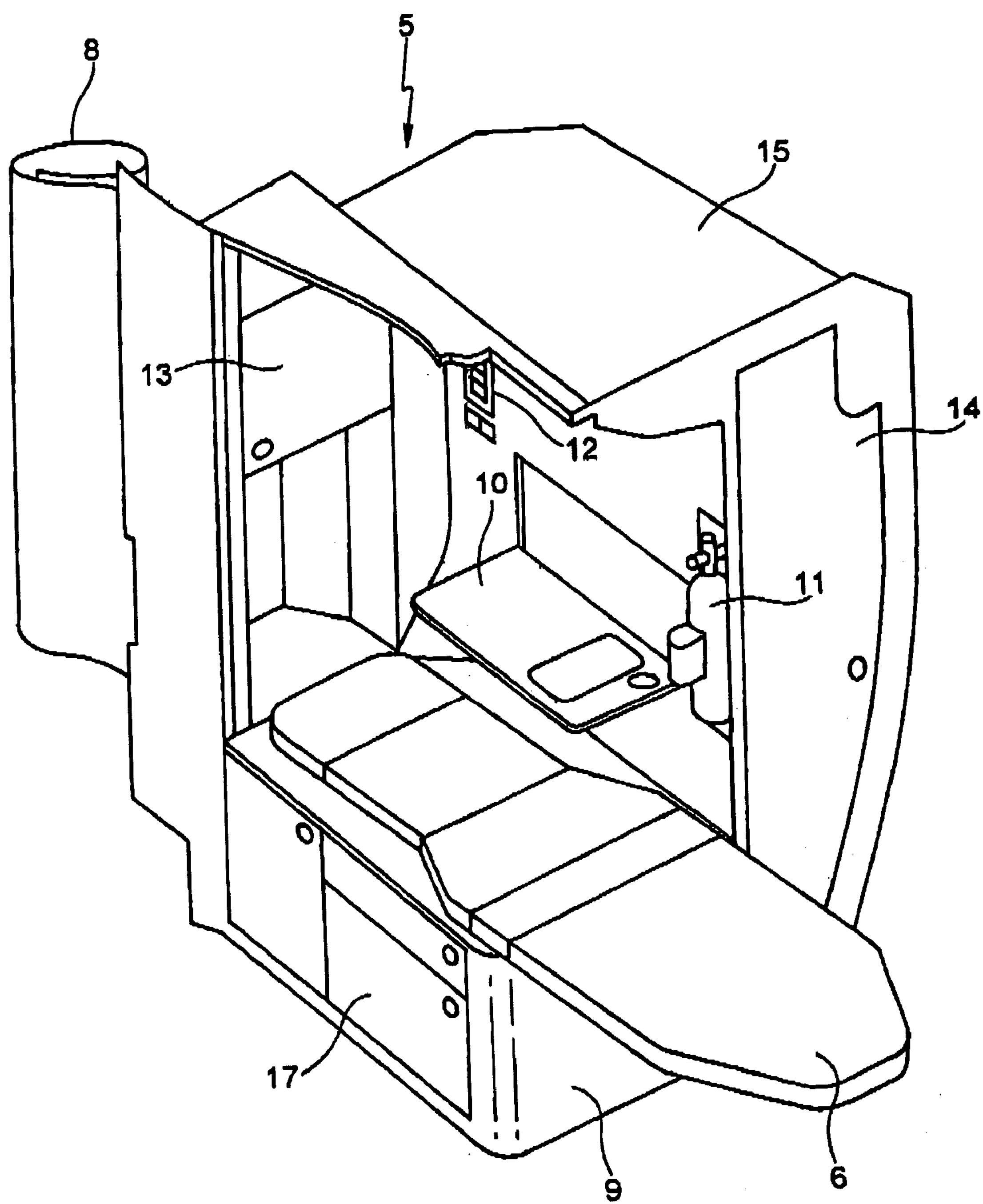
Figure 5:
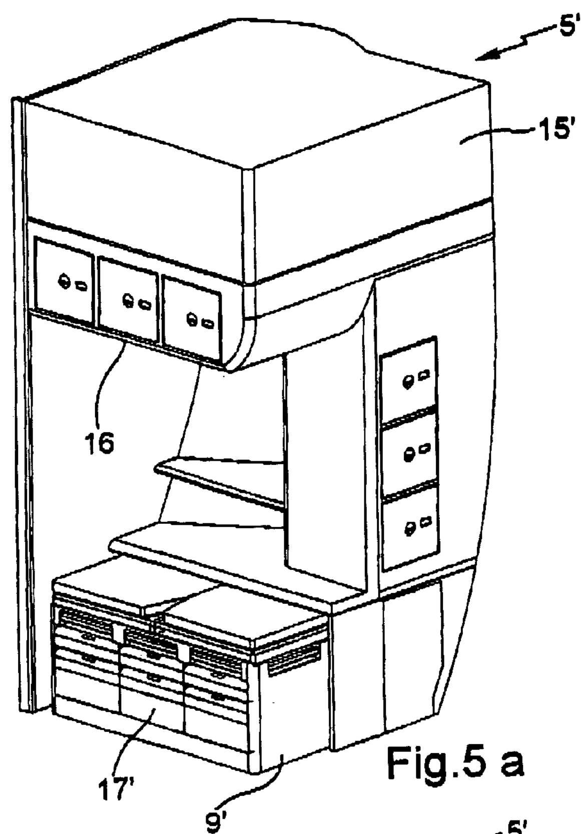
Figure 5:
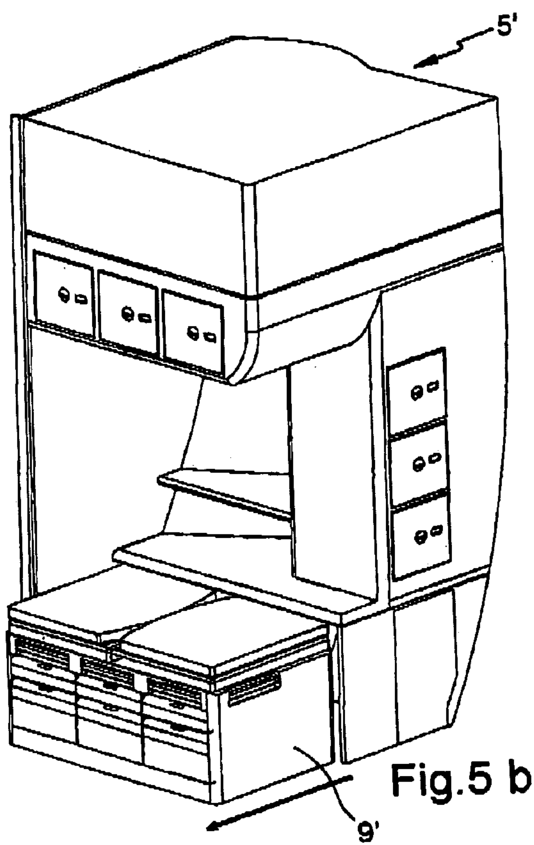
Figure 5:
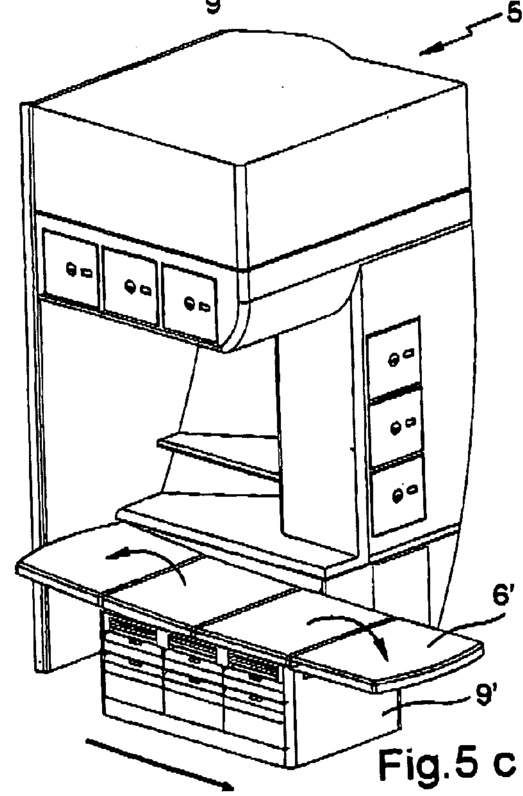
Figure 6:
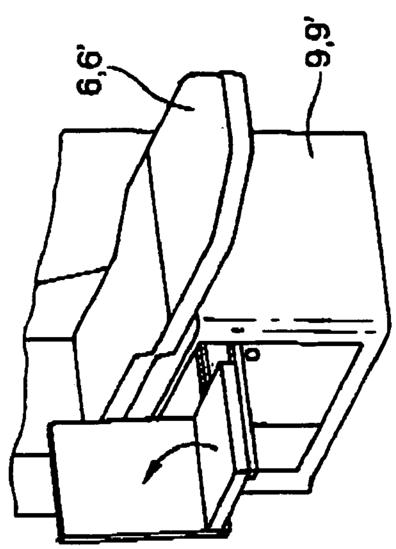
Figure 6:
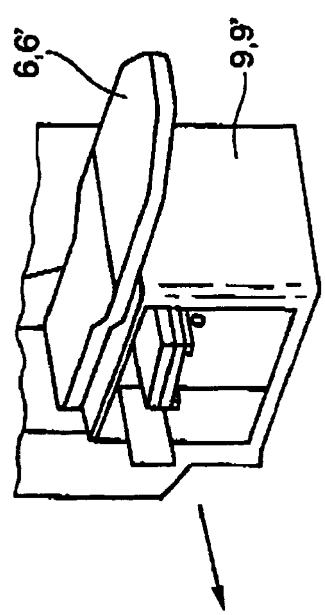
Figure 6:
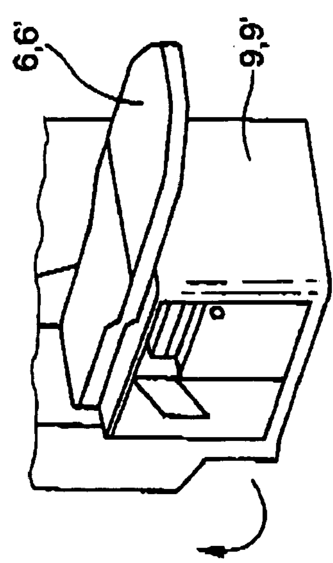

Illustration 1 shows the rear part of a bridge of an aircraft cabin. To the left of this illustration, there are the passenger seats aligned on several longitudinal columns separated by those aisles. Behind there seat there is a port side door 1 and a starboard side door 1' giving access to the cabin that permit the passengers to enter and to exit the aircraft. Fully in the back of this bridge, there is a staircase 2 that permits accessing another bridge of the aircraft. A folding seat 3 for one person, for instance a steward or an air hostess, belong to the commercial navigating personnel (hereinafter, CNP) is secured to the column of passenger seats located to port side so that when a CNP member is seated on seat 3, he is looking towards the regulatory space 4 located in front of access door 1.

According to the invention, a medical module 5 is installed adjacent to access door 1. In this mode of execution, medical module 5 is placed between access door 1 and staircase 2. The area comprising medical module 5 and at least a part of the regulatory space 4 located in front of access door 1 can, in case of need, constitute a medical unit; in this case, this area can be isolated from the rest of the bridge by a curtain.

Medical module 5 includes a bed 6 and a seat 7 for a caregiver; this bed 6 and this seat 7 are both shown in the deployed position on illustration 1. It will be observed that for this invention, one designates by "caregiver" or "care provider" the main person responsible aboard the aircraft for diagnosing or providing medical care to a passenger who has become ill or who has injured himself. For instance, this can be a CNP member who has received medical training, such as nursing or first aid training, or else, a medical doctor who is by chance among the passengers.

Illustration 2*a* shows a view towards the back of the medical unit, with a caregiver seated on seat 7 providing care to a patient lying down on bed 6. Here, medical module 5 is placed between access door 1 and staircase 2.

Illustration 2*b* shows a side view of the same medical unit, with a caregiver seated on seat 7 and a CNP member sitting on seat 3. The double arrow shows that bed 6 can be moved longitudinally so as to position the patient's body optimally in front of the caregiver.

Illustrations 3*a*, 3*b* and 3*c* show a medical module 5 according to a first mode of execution.

When there is no passenger to care for in the medical unit according to the invention, medical module 5 is closed, as shown on illustration 3*a*. On the other hand, when one wants to use the medical unit, one opens medical module 5, as shown on illustration 3*b*, by sliding a drum door 8 backwards that rolls onto itself at the end of medical module 5. Illustration 3*c* shows medical module 5 with the drum door 8 fully folded. This illustration 3*c* also shows bed 6 in the folded position, secured to a box 9 located at the foot of medical module 5.

Illustration 4 shows this medical module 5 with bed 6 lying flat on the box 9 and in the deployed position.

Bed 6 is preferably constituted of several articulated elements, so as to be able, as needed, to raise the back of bed 6 and/or lift the patient's legs (not shown on illustration 4) lying in bed 6. Straps (not shown) permit securing the patient to bed 6.

Medical module 5 includes a roof 15, under which lamps (not shown) are located to shine light onto the patient. Preferably, this roof contains a hook (not shown) to which a perfusion device can be suspended.

Illustration 4 also shows, as an example, a certain number of components that can usefully equip medical module 5. As such, one sees a removable tray 10 secured to a wall of medical module 5 within reach of the patient, an oxygen tank 11, a set of power outlets 12, a compartment 13 for storing a cover and a pillow and a compartment 14 to store medications and various medical instruments.

One can also provide for audiovisual equipment (not shown) that would permit the caregiver to be in contact with medical personnel on the ground, that might advise the caregiver on board about the best care for the medical problem suffered by the patient.

Illustrations 5*a*, 5*b* and 5*c* show a medical module 5' according to the second mode of execution.

Illustration 5*a* shows this medical module 5' when there is no passenger to care for in the medical unit according to the invention. Medical module 5' does not include any rear compartment (such as compartment 13 of the first mode of execution), which permits placing medical module 5' against a possible wall in the back of the cabin. Illustration 5*a* also shows a variant for roof 15' of the medical module, according to which storage compartments 16 are arranged in roof 15'.

When one wants to operate the medical unit according to this second mode of execution, one slides in the transversal direction a bin 9' located at the base of medical module 5', as shown in illustration 5*b*. Then, bin 9' is slid in the longitudinal direction up to the position desired by the caregiver, as shown on illustration 5*c*. Finally, one deploys a bed 6' that is secured on top of bin 9'. This bed 6' includes several articulated panels that permit lifting or lowering the patient's head and legs as desired.

Irrespective of the mode of execution of medical module 5, 5', the latter includes preferably a compartment in which a seat 7 is stored for the caregiver; this compartment can be comfortably arranged in a bin 9, 9' stationary or mobile, located at the bottom of medical module 5, 5'. Illustration 6*a* shows this compartment after it has been opened. Illustration 6*b* shows how said seat 7 is removed from said compartment. Finally, illustration 6*c* shows this seat 7 in the deployed position, secured to the bin 9 (respectively, 9') on the side of bed 6 (respectively 6').

Bin 9, 9' can in fact include beneficially other compartments 17, 17', for instance to store medical equipment.

As such, one sees that medical module 5, 5' contains in a compact way very complete medical equipment, and that, if a passenger becomes ill or is hurt during flight, the person designated to administer care to this passenger can provide him with high quality emergency care under very good conditions of comfort, and as such, efficiently on a medical level, in the medical unit according to the invention.

The invention claimed is:

1. An aircraft cabin comprising:

an area configured to permit administration of first aid medical care to a passenger, with said area comprising at least a regulatory space located in front of an access door to said cabin, wherein the rest of this area is occupied by a medical module fully dedicated to said first aid medical care, wherein said medical module includes a bed that is configured to be folded inside the medical module and that is configured to be deployed in an essentially longitudinal position with respect to the fuselage of the aircraft, and wherein the medical module includes a seat for a caregiver that is configured to be folded inside the medical module and be deployed on the side of the bed.

2. The aircraft cabin according to claim 1, wherein the aircraft cabin includes at least two bridges and a staircase to link these two bridges, and said medical module is located in a corner of the cabin located between said staircase and the access door to the cabin.

3. The aircraft cabin according to claim 1, wherein said bed is configured to slide longitudinally.

4. The aircraft cabin according to claim 1, wherein the cabin includes a folding seat located on the side of said regulatory space that is opposite a side where the medical module is located.

5. An aircraft cabin comprising:

an area configured to permit administration of first aid medical care to a passenger;

a foldable bed disposed within the area;

the area including a regulatory space located in front of an access door;

the rest of the area being occupied by a medical module fully dedicated to first aid medical care, wherein the area includes a mobile bin configured to move toward and away from a proximate fuselage wall, the foldable bed being disposed on the mobile bin.

6. An aircraft cabin comprising:

an area, located in a corner of the cabin between a stairwell and an access door to the cabin and to permit administration of first aid medical care to a passenger;

a foldable bed disposed within the area;

the area including a regulatory space located in front of the access door;

the rest of the area being occupied by a medical module fully dedicated to first aid medical care, wherein the area includes a sliding drum door.

7. The aircraft cabin according to claim 6, wherein the area includes a mobile bin configured to move toward and away from a proximate fuselage wall and containing a foldable seat.

8. The aircraft cabin according to claim 7, wherein the foldable seat is configured to slide into and out of the mobile bin.

9. The aircraft cabin according to claim 6, wherein the area includes audiovisual equipment configured to communicate with personnel on the ground.

* * * * *